United States Patent
Veilleux, Jr. et al.

(10) Patent No.: US 10,112,271 B2
(45) Date of Patent: Oct. 30, 2018

(54) COMPACT HEAT EXCHANGER

(71) Applicant: HAMILTON SUNDSTRAND CORPORATION, Charlotte, NC (US)

(72) Inventors: Leo J. Veilleux, Jr., Wethersfield, CT (US); Lubomir A. Ribarov, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 608 days.

(21) Appl. No.: 14/669,202

(22) Filed: Mar. 26, 2015

(65) Prior Publication Data

US 2016/0282061 A1    Sep. 29, 2016

(51) Int. Cl.
| | |
|---|---|
| *B23P 15/26* | (2006.01) |
| *F28F 7/02* | (2006.01) |
| *F28D 7/00* | (2006.01) |
| *F28F 1/04* | (2006.01) |
| *B22F 3/105* | (2006.01) |
| *B22F 5/10* | (2006.01) |
| *B33Y 80/00* | (2015.01) |
| *B33Y 10/00* | (2015.01) |
| *B29C 64/153* | (2017.01) |
| *F28D 21/00* | (2006.01) |

(52) U.S. Cl.
CPC .......... *B23P 15/26* (2013.01); *B22F 3/1055* (2013.01); *B22F 5/106* (2013.01); *B29C 64/153* (2017.08); *B33Y 10/00* (2014.12); *B33Y 80/00* (2014.12); *F28D 7/0066* (2013.01); *F28F 1/04* (2013.01); *F28F 7/02* (2013.01); *F28D 2021/0021* (2013.01); *F28F 2260/02* (2013.01); *Y02P 10/295* (2015.11)

(58) Field of Classification Search
CPC .................. B23P 15/26; F28D 7/0066; F28D 2020/0021; F28F 1/04; F28F 7/02; F28F 2260/02; B33Y 10/00; B33Y 80/00; B29C 64/153; B22F 3/1055; B22F 5/106; Y02P 10/295
USPC ......................................................... 165/165
See application file for complete search history.

(56) References Cited

U.S. PATENT DOCUMENTS

| | | | | |
|---|---|---|---|---|
| 5,725,051 | A * | 3/1998 | Veltkamp ................ | F28F 21/06 165/164 |
| 7,156,159 | B2 * | 1/2007 | Lovette ..................... | F28F 3/12 165/104.33 |

(Continued)

*Primary Examiner* — Raheena R Malik
(74) *Attorney, Agent, or Firm* — Cantor Colburn LLP

(57) ABSTRACT

A compact heat exchanger is provided and includes a first manifold defining an inlet for receiving from a component a fluid to be cooled and an outlet for returning the cooled fluid to the component to cool the component. A second manifold is disposed spaced from the first manifold. A core extends between and fluidly communicates with the manifolds and includes hexagonal channels. Each channel is formed by mini-tubes defining respective triangular passages. A cross-section of the core defines an irregular-cross structure. The fluid enters the inlet of the first manifold, makes a first pass through the mini-tubes to the second manifold, makes a second pass through the mini-tubes to the first manifold such that the fluid is cooled across the mini-tubes, exits the first manifold through the outlet, and returns to the component to cool the component. A method of manufacturing the heat exchanger is provided also.

9 Claims, 4 Drawing Sheets

(56) References Cited

U.S. PATENT DOCUMENTS

| | | | |
|---|---|---|---|
| 7,285,153 B2* | 10/2007 | Bruun | F23C 13/00 |
| | | | 165/165 |
| 7,468,202 B2* | 12/2008 | Sakamoto | B01D 39/2068 |
| | | | 428/116 |
| 8,851,156 B2* | 10/2014 | Semmes | F28F 19/006 |
| | | | 165/134.1 |
| 2002/0104645 A1* | 8/2002 | Yoshida | F28D 9/0043 |
| | | | 165/166 |
| 2005/0236142 A1* | 10/2005 | Boudreaux | F28F 3/02 |
| | | | 165/80.3 |
| 2005/0282051 A1* | 12/2005 | Zhou | B01J 19/2485 |
| | | | 429/413 |
| 2008/0210413 A1 | 9/2008 | Hislop et al. | |
| 2009/0178426 A1* | 7/2009 | Bhatti | F25B 39/04 |
| | | | 62/304 |
| 2010/0300666 A1* | 12/2010 | Hislop | B23K 1/0056 |
| | | | 165/173 |
| 2011/0075786 A1* | 3/2011 | McWhirter | F28D 1/0213 |
| | | | 376/405 |
| 2012/0234021 A1* | 9/2012 | Okuda | F25B 21/02 |
| | | | 62/3.2 |
| 2012/0247732 A1 | 10/2012 | Suzuki et al. | |
| 2013/0213620 A1* | 8/2013 | Miyazaki | F28F 7/02 |
| | | | 165/154 |
| 2014/0020877 A1 | 1/2014 | Suzuki et al. | |
| 2014/0090821 A1 | 4/2014 | Suzuki et al. | |

\* cited by examiner

COMPACT HEAT EXCHANGER

BACKGROUND

This invention relates to, generally, a heat exchanger and, more specifically, a multi-channel compact heat exchanger for use in an aircraft or aerospace application.

Several heat exchangers are known to be used in an aerospace or aircraft application. For example, each heat exchanger of an aircraft can include three fluid circuits. More specifically, a first fluid circuit can deliver a cool fluid to a first power-electronics component for cooling the first component and receive the resulting (now hotter) fluid that has cooled the first component. A second fluid circuit can deliver a cool fluid to a second power-electronics component for cooling the second component and receive the resulting (now hotter) fluid that has cooled the second component. A third fluid circuit can provide a cooling fluid over the heat exchanger to cool the (now hotter) fluids from the first and second circuits within the heat exchanger. The resulting (now cooler) fluid can then be delivered outwardly of the aircraft or to the first and second components for cooling of the components.

A core of the heat exchanger can include also a multitude of very small channels or tubes (known as "mini-channels" or "mini-tubes") that move a fluid between opposed ends of the core. The fluid supplied from the third circuit passes over the mini-tubes. In can be desired that the core have a certain complex structure.

However, conventional manufacturing methods—such as milling, sheet-bending, extruding, etc.—cannot produce some desired complex structures due to limitations of the methods with respect to, for instance, shape-formation, spacing, accuracy in production, variability in quality, and, ultimately, cost.

BRIEF DESCRIPTION

In a non-limiting exemplary embodiment according to the invention, a compact heat exchanger for use in an aircraft is provided. The heat exchanger includes a first manifold defining an inlet configured to receive from a component a fluid to be cooled and an outlet configured to return the cooled fluid to the component to cool the component. A second manifold is disposed spaced from the first manifold. A core extends between and fluidly communicates with the first and second manifolds and includes a plurality of channels each of which is of generally hexagonal cross-section. Each channel is also formed by a plurality of mini-tubes defining respective passages each of which is of generally triangular cross-section. A cross-section of the core defines an irregular-cross structure. The fluid is configured to enter the inlet of the first manifold, make a first pass through the mini-tubes to the second manifold, make a second pass through the mini-tubes to the first manifold such that the fluid is cooled across the mini-tubes, exit the first manifold through the outlet, and return to the component to cool the component.

In a non-limiting exemplary embodiment according to the invention, a method of manufacturing the heat exchanger is provided as well. The manufacturing method comprises steps of fabricating a first manifold defining an inlet configured to receive from a component a fluid to be cooled and an outlet configured to return the cooled fluid to the component to cool the component. A second manifold configured to be disposed spaced from the first manifold is fabricated. A core is fabricated by a process of three-dimensional printing. The core is configured to extend between and fluidly communicate with the first and second manifolds and includes a plurality of channels each of which is of generally hexagonal cross-section. Each channel is also formed by a plurality of mini-tubes defining respective passages each of which is of generally triangular cross-section. A cross-section of the core defines an irregular-cross structure. The fluid is configured to enter the inlet of the first manifold, make a first pass through the mini-tubes to the second manifold, make a second pass through the mini-tubes to the first manifold such that the fluid is cooled across the mini-tubes, exit the first manifold through the outlet, and return to the component to cool the component. The first and second manifolds and core are configured with each other to form the heat exchanger.

The irregular-cross structure of the core of the heat exchanger generally approximates a complex snowflake-crystal structure. The "simplified" irregular-cross structure avoids issues related to contamination, structural non-uniformity, hot/cold spots, high thermal-stress areas, etc. Also, the approximated snowflake-crystal structure has a high strength-to-weight ratio as a load-carrying structure. Furthermore, the approximated snowflake-crystal structure uses less material than does a honeycomb structure or an equally rigid solid sheet, panel, beam, shell, or other structural profile while providing a larger surface area for heat transfer. In addition, the approximated snowflake-crystal structure has a favorable crush-strength-to-weight ratio that gives it an ability to absorb kinetic energy from either a local or global (total) crush-transient event. Moreover, the approximated snowflake-crystal structure can absorb a crush load while transferring only a minimal portion of that load to its support structure. The approximated snowflake-crystal structure has a favorable surface-to-weight ratio as well.

The heat exchanger is compact and lightweight. Also, the heat exchanger defines high surface-area-to-weight and strength-to-weight ratios. Furthermore, the heat exchanger can sustain high internal pressures inside the mini-tubes. In addition, the heat exchanger defines an increased hot/cold surface area, a low pressure drop across the core of the heat exchanger, and a robust design. Moreover, the heat exchanger allows for enhanced capability and operability due to improved cooling of the heat exchanger. The heat exchanger provides very efficient heat transfer as well.

The manufacturing method allows for formation of a variety of desired approximated snowflake-crystal structures of the core of the heat exchanger. More specifically, there are no limitations of the manufacturing method with respect to, for instance, shape-formation, spacing, accuracy in production, variability in quality, and, ultimately, cost. Also, the manufacturing method is accurate, efficient, and fast.

BRIEF DESCRIPTION OF DRAWING

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION

The figures show a non-limiting exemplary embodiment of a multi-channel compact heat exchanger according to the invention, generally indicated at 10, configured to be implemented with an aircraft or aerospace application. In this regard, the heat exchanger 10 is disclosed herein as being implemented with high-pressure fluid (i.e., air and/or liquid) applications. However, it should be readily appreciated that the heat exchanger 10 may be implemented with any suitable application, in general, and any suitable type of pressure and fluid application, in particular. It should be readily appreciated also that the heat exchanger 10 can be non-compact or implemented with a pipe or curved tube to fit around or in an engine of an aircraft. It should be readily appreciated also that the heat exchanger 10 can be implemented with various engines of commercial and non-commercial aircraft.

Figure 1:
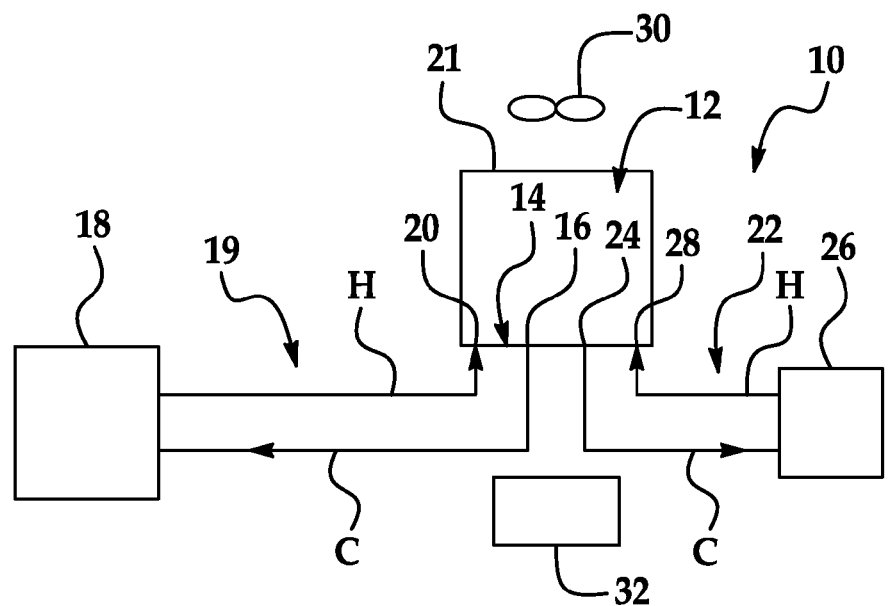
FIG. 1 schematically shows a non-limiting exemplary embodiment of a heat exchanger for use in an aircraft or aerospace application.

Referring now to FIG. 1, the heat exchanger 10 is schematically shown. The heat exchanger 10 is configured to be incorporated into an aircraft (not shown). As can be seen, the heat exchanger 10 defines a core, generally indicated at 12, of the heat exchanger 10. A first manifold, generally indicated at 14, defines an outlet 16 for delivering a cooling fluid C to a first power-electronics component 18. The core 12 defines a first fluid circuit, generally indicated at 19. (A direction of flow of the fluid C from the outlet 16 to the first component 18 is as indicated by the corresponding arrow shown in the figure.) The first circuit 19 defines also an inlet 20 for receiving the resulting (now hotter) fluid H that has cooled the first component 18. [A direction of flow of the fluid H from the first component 18 to the inlet 20 is as indicated by the corresponding arrow shown in the figure.] In this way, the fluid C is circulated to the first component 18, and the fluid H is circulated from the first component 18 and, as described below, configured to be cooled across the heat exchanger 10. A second manifold 21 is disposed spaced from the first manifold 14. The core 12 extends between and fluidly communicates with the first and second manifolds 14, 21.

The core 12 defines also a second fluid circuit, generally indicated at 22, defining an outlet 24 for delivering a cooling fluid C to a second power-electronics component 26. (A direction of flow of the fluid C from the outlet 24 to the second component 26 is as indicated by the corresponding arrow shown in the figure.) The second circuit 22 defines also an inlet 28 for receiving the resulting (now hotter) fluid H that has cooled the second component 26. [A direction of flow of the fluid H from the second component 26 to the inlet 28 is as indicated by the corresponding arrow shown in the figure.] In this way, the fluid C is circulated to the second component 26, and the fluid H is circulated from the second component 18 and, as described below, configured to be cooled across the heat exchanger 10.

The heat exchanger 10 includes also a third fluid circuit (not shown) for providing a cooling fluid (not shown) over the heat exchanger 10 to cool the fluids H from the first and second circuits 19, 22 within the heat exchanger 10. Toward that end, a fan 30 (shown located downstream of the heat exchanger 10) is configured to drive the cooling fluid from the third circuit over the heat exchanger 10 to cool the fluids H. In an aspect of the embodiment, the fan 30 is of a "RAM" type. The fan 30 may draw the cooling fluid—for example, air—from a restroom or galley 32 of the aircraft. The air can be delivered outwardly of the aircraft.

It should be readily appreciated that the fan 30 can be any suitable type of fan. It should be readily appreciated also that the cooling fluid drawn from the fan 30 can be any suitable type of cooling fluid. It should be readily appreciated also that the fan 30 may draw the cooling fluid from any suitable location of the aircraft. It should be readily appreciated also that the fan 30 may be located in any suitable location relative to the heat exchanger 10 (e.g., upstream of the heat exchanger 10).

Figure 2:
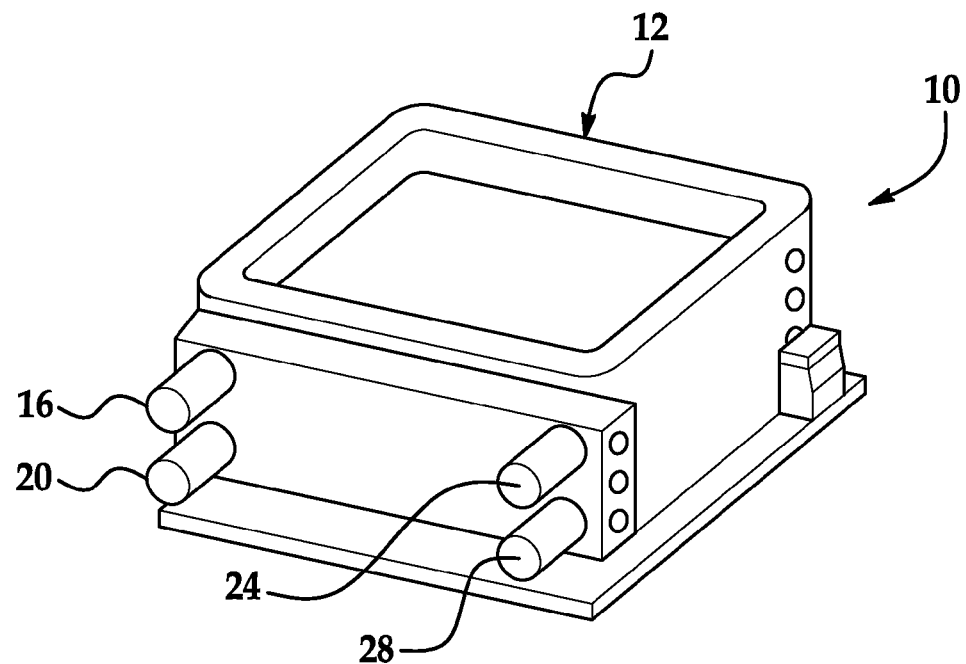
FIG. 2 shows a view of the heat exchanger illustrated in FIG. 1.
Figure 3:
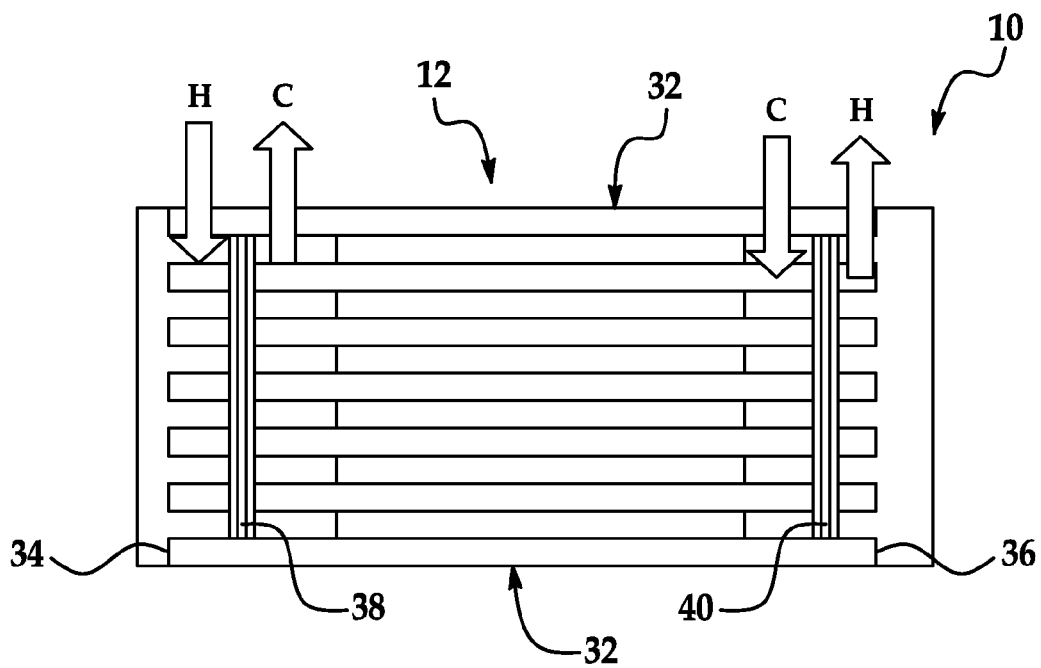
FIG. 3 shows a view of a portion of the heat exchanger illustrated in FIG. 1.

Referring now to FIG. 2, a view of the heat exchanger 10 is shown. As can be seen, the outlet 16 and inlet 20 of the first circuit 19 and the outlet 24 and inlet 28 of the second circuit 22 are associated with the core 12 of the heat exchanger 10. The fluid C circulated through the first and second circuits 19, 22 may be any appropriate fluid or combination of fluids. In an aspect, a "60/40" mixture of propylene glycol and water may be used. However, it should be readily appreciated that any combination of fluids can have any suitable mixture thereof Referring now to FIG. 3, a portion of the heat exchanger 10 is shown. As can be seen, the core 12 includes a plurality of very small tubes (known as "mini-"mini-tubes"), generally indicated at 32. Each mini-tube 32 extends between the first manifold 14 (FIG. 1) at a first axial end 34 of the mini-tube 32 and the second manifold 21 (FIG. 1) at a second axial end 36 of the mini-tube 32. Fluid passages defined within the manifolds 14, 21 (FIG. 1) direct the fluids C, H. The mini-tubes 32 define an axial length of the mini-tubes 32 and are spaced across a width of the heat exchanger 10, which is defined perpendicularly to the directions of flow of the fluids C, H through the mini-tubes 32.

The fluid H [which has cooled the first component 18 (FIG. 1)] flows from the inlet 20 (FIG. 1) of the core 12 downwardly as shown in the left side of the figure. The fluid H is cooled across the heat exchanger 10 and returns as resulting (cooler) fluid C through another adjacent mini-tube 32 to the outlet 16 (FIG. 1) of the core 12. A baffle divider 38 divides between the pair of adjacent mini-tubes 32. The fluid C flows outwardly of the outlet 16 (FIG. 1) for delivery of the fluid C to the first component 18 (FIG. 1).

Likewise, fluid C flows downwardly as shown in the right side of the figure. The fluid C is heated across the heat exchanger 10 and returns as resulting (warmer) fluid H through another adjacent mini-tube 32. A baffle divider 40 divides between the pair of adjacent mini-tubes 32. All of the structural elements of the heat exchanger 10 are typically formed of aluminum and brazed together to form the heat exchanger 10.

Figure 4:
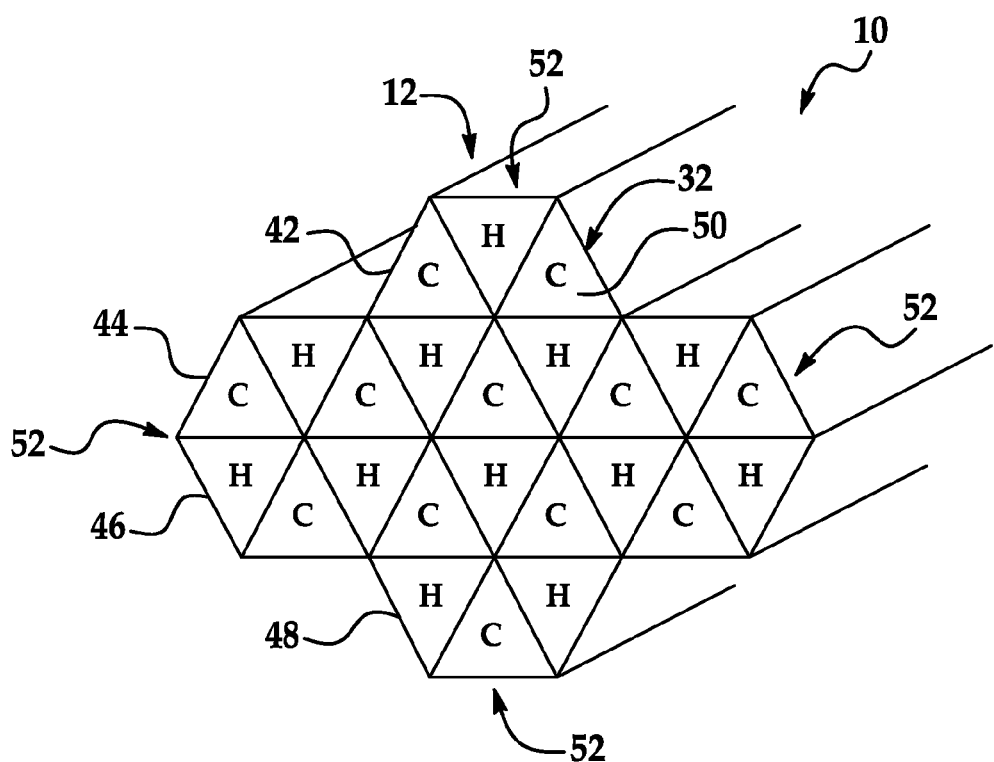
FIG. 4 is a view of a non-limiting exemplary embodiment of a structure of a core of the heat exchanger illustrated in FIG. 1.

Referring now to FIG. 4, a non-limiting exemplary embodiment of a structure of the core 12 of the heat exchanger 10 is shown. As can be seen, a cross-section of the core 12 defines structure of an irregular cross. The irregular-cross structure generally approximates a complex snowflake-crystal structure and can, thus, be referred to as a "'simplified' irregular-cross structure."

More specifically, the core 12 includes a plurality of adjoining layers or rows 42, 44, 46, 48 of the mini-tubes 32. In the example shown in the figure, there are four such rows 42, 44, 46, 48 (namely, top, upper-middle, lower-middle, and bottom rows 42, 44, 46, 48). In turn, each row 42, 44, 46, 48 includes a plurality of adjoining mini-tubes 32. In an aspect, the mini-tubes 32 are the same size with respect to each other, and the number of mini-tubes 32 in each row 42, 44, 46, 48 is odd. In the example shown, each of the top and bottom rows 42, 48 includes three mini-tubes 32, and each of the upper- and lower-middle rows 44, 46 includes nine mini-tubes 32. Each mini-tube 32 defines a passage 50, and the mini-tube 32 and passage 50 each defines a generally triangular cross-section. In an aspect, the cross-section defines an isosceles triangle.

It should be readily appreciated that the core 12 can include any suitable number of rows 42, 44, 46, 48. It should be readily appreciated also that each row 42, 44, 46, 48 can include any suitable number of mini-tubes 32. It should be readily appreciated also that each mini-tube 32 can be any suitable size. It should be readily appreciated also that the cross-section of each of the mini-tube 32 and passage 50 need not be a true isosceles triangle. It should be readily appreciated also that the cross-section of each of the mini-tube 32 and passage 50 can be any suitable shape.

Adjacent mini-tubes 32 in each row 42, 44, 46, 48 alternate their respective orientations with respect to each other between upright and inverted. In the example shown, in the top row 42 (moving from left to right), first and third mini-tubes 32 are upright, and a second mini-tube 32 is inverted. In the upper-middle row 44, first, third, fifth, seventh, and ninth mini-tubes 32 are upright, and second, fourth, sixth, and eighth mini-tubes 32 are inverted. However, the lower-middle and bottom rows 46, 48 are "mirror" images of the upper-middle and top rows 44, 42, respectively. As such, in the lower-middle row 46, first, third, fifth, seventh, and ninth mini-tubes 32 are inverted, and second, fourth, sixth, and eighth mini-tubes 32 are upright. In the bottom row 48, first and third mini-tubes 32 are inverted, and a second mini-tube 32 is upright. In this way, each row 42, 44, 46, 48 defines a trapezoidal cross-section, the corresponding trapezoids in the top and upper-middle rows 42, 44 being upright and the corresponding trapezoids in the lower-middle and bottom rows 46, 48 being inverted.

Locations of the respective flows of the fluids C, H in corresponding mini-tubes 32 also alternate in each row with consecutive passages 50. In the example shown, all of the respective flows of the fluids C are located in the upright mini-tubes 32, and all of the respective flows of the fluids H are located in the inverted mini-tubes 32. In this way, no two flows of the fluids C can be located directly side-by-side or one on top of another. Rather, two adjacent flows of the fluids C can be located only diagonal with each other. The same holds for the flows of the fluids H relative to each other. However, it should be readily appreciated that the fluids C, H can alternate in each row in any suitable manner.

The irregular-cross structure of the core 12 of the heat exchanger 10 can be viewed as being defined by a plurality of adjoining channels, generally indicated at 52, each of which defines a generally hexagonal cross-section. In the example shown, there are four adjoining channels 52. More specifically, each channel 52 defines a quadrant of the core 12 and is formed by six adjoining mini-tubes 32 that meet at a midpoint of the channel 52. Shared interior sides of the respective mini-tubes 32 extend from the midpoint to corresponding exterior corners of the channel 52. The four adjoining quadrants can be identified as top, bottom, left, and right quadrants.

Figure 5:
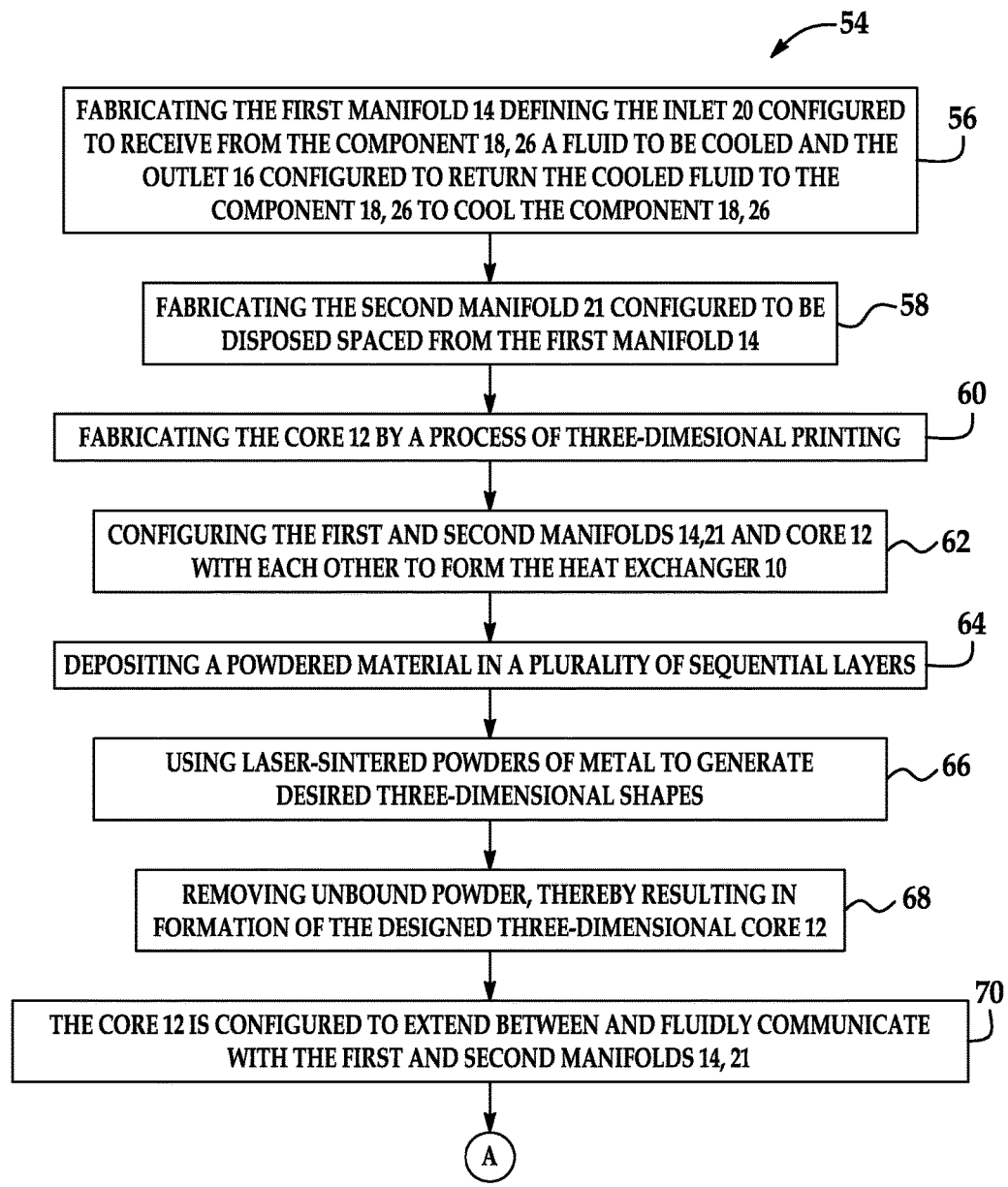
FIG. 5 is a block diagram showing a non-limiting exemplary embodiment of a method of manufacturing the heat exchanger illustrated in FIG. 1.
Figure 5:
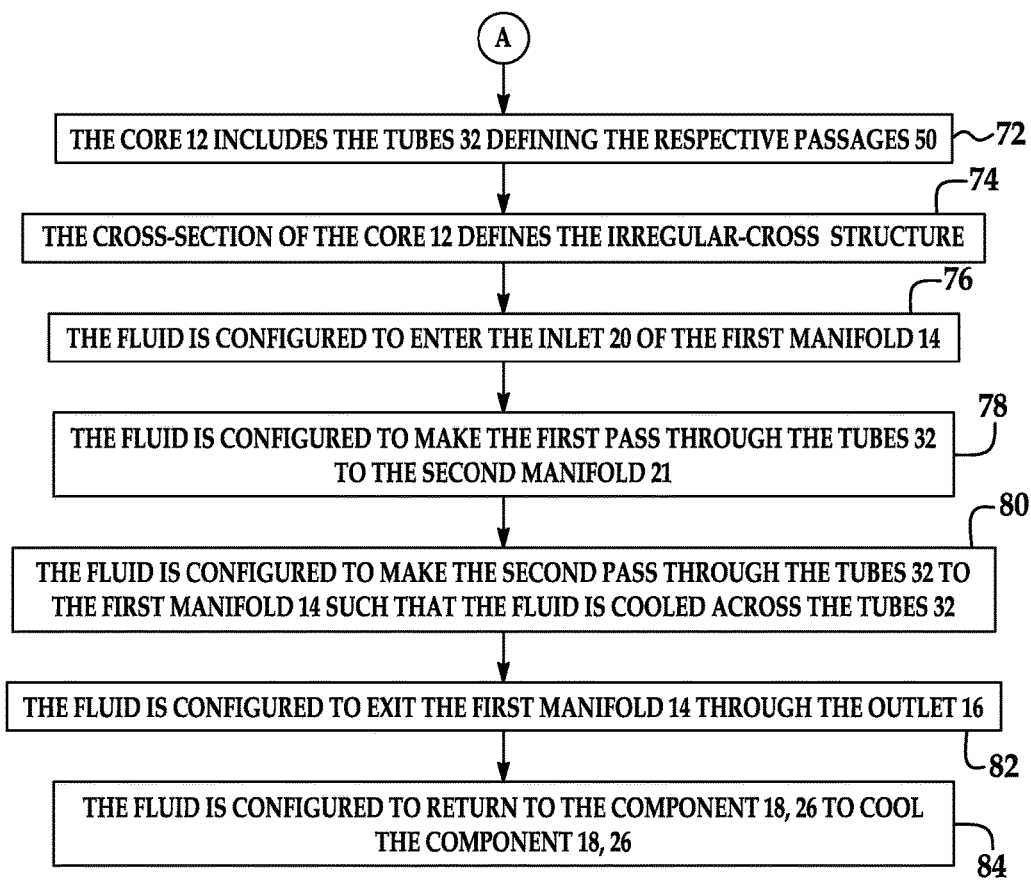

Referring now to FIG. 5, a non-limiting exemplary embodiment of a method of manufacturing the structure of the core 12 of the heat exchanger 10, generally indicated at 54, is diagrammatically shown. As can be seen, in the manufacturing method 54, at step 56, the first manifold 14 is fabricated defining the inlet 20 configured to receive from the component 18, 26 a fluid to be cooled and the outlet 16 configured to return the cooled fluid to the component 18, 26 to cool the component 18, 26. At step 58, the second manifold 21 is fabricated configured to be disposed spaced from the first manifold 14. At step 60, the core 12 is fabricated by a process of three-dimensional printing (3-D printing or 3DP) (i.e., a modern additive-manufacturing process). At step 62, the first and second manifolds 14, 21 and core 12 are configured with each other to form the heat exchanger 10.

More specifically, the 3DP is employed to produce, in general, the channels 52 and, in particular, mini-tubes 32 of the core 12 of the heat exchanger 10. In particular, 3DP is a method of free-form fabrication and includes, at step 64, depositing a powdered material (e.g., ceramic, metal, plastic, or any combination thereof) in a plurality of sequential layers (i.e., one layer on top of another layer). In an aspect, at step 66, laser-sintered powders of metal are used to generate desired three-dimensional shapes. At step 68, unbound powder is removed, thereby resulting in formation of the designed three-dimensional core 12.

With formation of the designed three-dimensional core 12, at step 70, the core 12 is configured to extend between and fluidly communicate with the first and second manifolds 14, 21. At step 72, the core 12 includes the mini-tubes 32 defining the respective passages 50. At step 74, the cross-section of the core 12 defines the irregular-cross structure. At step 76, the fluid is configured to enter the inlet 20 of the first manifold 14. At step 78, the fluid is configured to make the first pass through the mini-tubes 32 to the second manifold 21. At step 80, the fluid is configured to make the second pass through the mini-tubes 32 to the first manifold 14 such that the fluid is cooled across the mini-tubes 32. At step 82, the fluid is configured to exit the first manifold 14 through the outlet 16. At step 84, the fluid is configured to return to the component 18, 26 to cool the component 18, 26.

The irregular-cross structure of the core 12 of the heat exchanger 10 generally approximates a complex snowflake-crystal structure. The "simplified" irregular-cross structure avoids issues related to contamination, structural non-uniformity, hot/cold spots, high thermal-stress areas, etc. Also, the approximated snowflake-crystal structure has a high strength-to-weight ratio as a load-carrying structure. Furthermore, the approximated snowflake-crystal structure uses less material than does a honeycomb structure or an equally rigid solid sheet, panel, beam, shell, or other structural profile while providing a larger surface area for heat transfer. In addition, the approximated snowflake-crystal structure has a favorable crush-strength-to-weight ratio that gives it an ability to absorb kinetic energy from either a local or global (total) crush-transient event. Moreover, the approximated snowflake-crystal structure can absorb a crush load while transferring only a minimal portion of that load to its support structure. The approximated snowflake-crystal structure has a favorable surface-to-weight ratio as well.

The heat exchanger 10 is compact and lightweight. Also, the heat exchanger 10 defines high surface-area-to-weight and strength-to-weight ratios. Furthermore, the heat exchanger 10 can sustain high internal pressures inside the mini-tubes 32. In addition, the heat exchanger 10 defines an increased hot/cold surface area, a low pressure drop across the core 12 of the heat exchanger 10, and a robust design. Moreover, the heat exchanger 10 allows for enhanced capability and operability due to improved cooling of the heat exchanger 10. The heat exchanger 10 provides very efficient heat transfer as well.

The manufacturing method 54 allows for formation of a variety of desired approximated snowflake-crystal structures of the core 12 of the heat exchanger 10. More specifically, there are no limitations of the manufacturing method 54 with respect to, for instance, shape-formation, spacing, accuracy in production, variability in quality, and, ultimately, cost. Also, the manufacturing method 54 is accurate, efficient, and fast.

While the invention has been described in detail in connection with only a limited number of embodiments, it should be readily appreciated that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various non-limiting embodiments of the invention have been described, it is to be readily appreciated that aspects of the invention may include only some of the described embodiments. Accordingly, the invention is not to be seen as limited by the foregoing description, but is only limited by the scope of the appended claims.

What is claimed:

1. A heat exchanger comprising:
   a first manifold defining an inlet configured to receive from a component a fluid to be cooled and an outlet configured to return the cooled fluid to the component to cool the component;
   a second manifold disposed spaced from the first manifold; and
   a core extending between and fluidly communicating with the first and second manifolds and including a plurality of channels, each of the plurality of channels has a generally hexagonal cross-section and is formed by six adjoining mini-tubes defining respective passages each of which is of generally triangular cross-section, the generally hexagonal cross-section of each of the plurality of channels being similar to one another, a cross-section of the core defining an irregular-cross structure and the fluid being configured to enter the inlet of the first manifold, make a first pass through the mini-tubes to the second manifold, make a second pass through the mini-tubes to the first manifold such that the fluid is cooled across the mini-tubes, exit the first manifold through the outlet, and return to the component to cool the component.

2. The heat exchanger as set forth in claim 1, wherein the cross-section of each of the mini-tubes defines an isosceles triangle.

3. The heat exchanger as set forth in claim 1, wherein the core includes a plurality of adjoining rows of the mini-tubes and each row includes a plurality of adjoining mini-tubes.

4. The heat exchanger as set forth in claim 3, wherein the core includes four adjoining rows of the mini-tubes, the mini-tubes are the same size with respect to each other, and the number of mini-tubes in each row is odd.

5. The heat exchanger as set forth in claim 4, wherein each of top and bottom rows includes three mini-tubes and each of a pair of middle rows includes nine mini-tubes.

6. The heat exchanger as set forth in claim 3, wherein adjacent mini-tubes in each row alternate their respective orientations with respect to each other between upright and inverted.

7. The heat exchanger as set forth in claim 3, wherein each row defines an upright or inverted trapezoidal cross-section.

8. The heat exchanger as set forth in claim 3, wherein locations of respective flows of the fluids in corresponding mini-tubes alternate in each row with consecutive passages such that two adjacent flows of cooled fluids are located only diagonal with each other.

9. The heat exchanger as set forth in claim 1, wherein the six adjoining mini-tubes of each channel meet at a midpoint of the channel and shared interior sides of the respective mini-tubes extend from the midpoint to corresponding exterior corners of the channel.

* * * * *